(12) United States Patent
Runde

(10) Patent No.: US 9,944,201 B2
(45) Date of Patent: Apr. 17, 2018

(54) QUICK ADJUST POWER ADJUSTER WITH TUBULAR LEAD SCREW

(71) Applicant: Magna Seating Inc, Aurora, CA (US)

(72) Inventor: David M Runde, Beverly Hills, MI (US)

(73) Assignee: Magna Seating Inc, Aurora, Ontario (CA)

( * ) Notice: Subject to any disclaimer, the term of this patent is extended or adjusted under 35 U.S.C. 154(b) by 0 days.

(21) Appl. No.: 15/379,544

(22) Filed: Dec. 15, 2016

(65) Prior Publication Data
US 2017/0197524 A1    Jul. 13, 2017

Related U.S. Application Data

(60) Provisional application No. 62/269,515, filed on Dec. 18, 2015.

(51) Int. Cl.
*B60N 2/07* (2006.01)
*B60N 2/06* (2006.01)
(Continued)

(52) U.S. Cl.
CPC .......... *B60N 2/067* (2013.01); *B60N 2/0232* (2013.01); *B60N 2/0715* (2013.01); *B60N 2/0875* (2013.01); *B60N 2002/0236* (2013.01)

(58) Field of Classification Search
CPC . B60N 2/06; B60N 2/07; B60N 2/067; B60N 2/0702; B60N 2/0715
(Continued)

(56) References Cited

U.S. PATENT DOCUMENTS

| 4,641,806 A | 2/1987 | Pipon et al. |
| 4,799,734 A | 1/1989 | Periou |

(Continued)

FOREIGN PATENT DOCUMENTS

| DE | 202010001548 | 5/2010 |
| JP | 06226137 | 8/1994 |

(Continued)

*Primary Examiner* — Steven M Marsh
(74) *Attorney, Agent, or Firm* — Miller Canfield

(57) ABSTRACT

A quick adjust power adjuster for adjusting the position of an upper track relative to a lower track of a seat track assembly comprises an elongated guide rod extending axially between opposite first and second ends and fixedly secured to the lower track. A tubular lead screw is slidably coupled to the guide rod. A driven assembly is operatively coupled to the tubular lead screw for axial travel along the tubular lead screw in response to rotation of the driven assembly. A drive assembly is fixedly coupled to the upper track and operatively coupled to the driven assembly for selectively rotating the driven assembly in opposite first and second directions for axial travel along the tubular lead screw. A release mechanism is coupled to the lower track and operable between a locked condition coupled to the tubular lead screw to prevent sliding movement of the tubular lead screw along the guide rod wherein the driven assembly and the drive assembly move axially along the tubular lead screw to slide the upper track relative to the lower track in a power operation mode and an unlocked condition decoupled from the tubular lead screw to allow sliding movement of the tubular lead screw along the guide rod while the driven assembly and the drive assembly remain axially fixed to the tubular lead screw to slide the upper track relative to the lower track in a manual operation mode.

10 Claims, 4 Drawing Sheets

(51) Int. Cl.
*B60N 2/02* (2006.01)
*B60N 2/08* (2006.01)

(58) Field of Classification Search
USPC .............. 248/424, 429; 297/344.1, 344.11
See application file for complete search history.

(56) References Cited

U.S. PATENT DOCUMENTS

| | | | | |
|---|---|---|---|---|
| 5,150,872 | A * | 9/1992 | Isomura | B60N 2/0232 |
| | | | | 248/429 |
| 5,516,071 | A | 5/1996 | Miyauchi | |
| 5,582,461 | A | 12/1996 | Pickles | |
| 7,325,851 | B2 * | 2/2008 | Ito | B60N 2/067 |
| | | | | 248/429 |
| 7,661,647 | B2 * | 2/2010 | Ito | B60N 2/0232 |
| | | | | 248/429 |
| 7,887,020 | B2 | 2/2011 | Ferguson et al. | |
| 9,499,073 | B2 * | 11/2016 | Tsuji | B60N 2/067 |
| 2006/0237987 | A1 * | 10/2006 | Nakamura | B60N 2/0232 |
| | | | | 296/65.13 |
| 2013/0186217 | A1 * | 7/2013 | Enokijima | B60N 2/067 |
| | | | | 74/89.33 |
| 2016/0059739 | A1 * | 3/2016 | Tsuji | B60N 2/0705 |
| | | | | 248/429 |
| 2016/0059740 | A1 * | 3/2016 | Shimizu | B60N 2/06 |
| | | | | 248/429 |

FOREIGN PATENT DOCUMENTS

| | | |
|---|---|---|
| JP | 06226138 | 8/1994 |
| JP | 06226139 | 8/1994 |
| JP | 06226140 | 8/1994 |

* cited by examiner

QUICK ADJUST POWER ADJUSTER WITH TUBULAR LEAD SCREW

CROSS-REFERENCE TO RELATED APPLICATIONS

This application claims priority to and all the benefits of U.S. Provisional Application No. 62/269,515, filed on Dec. 18, 2015 and entitled "Quick Adjust Power Adjuster with Tubular Nut".

BACKGROUND OF THE INVENTION

1. Field of the Invention

The invention relates to a quick adjust power adjuster for a seat track of an automotive vehicle seat assembly. More particularly, the invention relates to a quick adjust power adjuster having a tubular lead screw for selectively providing either powered or manual fore and aft movement of the seat assembly along a floor of an automotive vehicle.

2. Description of Related Art

Automotive vehicles include seat assemblies for supporting seat occupants within a passenger compartment of the vehicle. Typically, the seat assemblies include a generally horizontal seat cushion spaced above a floor of the vehicle and a generally vertical or upright seat back. The seat back is commonly operatively coupled to the seat cushion to allow for selective pivotal adjustment of the seat back relative to the seat cushion between a plurality of reclined seating positions. Many seat assemblies also include a seat track assembly coupled between the seat cushion and the floor to provide fore and aft movement of the seat assembly within the vehicle. Typically, the seat track assembly includes a lower track fixedly secured to the floor of the vehicle and an upper track slidably engaging the lower track. The upper track is fixedly secured to a bottom surface of the seat cushion to allow for sliding movement of the seat assembly along the lower track. It is well known in the vehicle seating art to provide a power seat track assembly driven by an electric motor for moving the upper track, and thus the seat assembly, relative to the lower track. Many such power seat track assemblies include a conventional gearbox or drive assembly operatively coupled in a longitudinal channel between the upper and lower tracks for converting rotational input of the motor into linear movement of the seat assembly. Several such examples are described in U.S. Pat. Nos. 8,226,063; 6,915,998; 6,575,421; 6,260,922; 5,816,555; 5,314,158; and 4,790,202. Typically, a threaded lead screw is fixedly secured to the lower track and the gearbox is operatively coupled between the lead screw and the upper track. The gearbox or drive assembly includes a housing having through holes or bores that are offset 90 degrees to align and retain a worm and a gear or worm wheel. The gear includes a threaded internal bore for threadably engaging the lead screw and a geared outer surface for meshing with the worm. In an arrangement of this kind, the worm is driven by a shaft extending from the motor which in turn causes the gear to rotate. Rotation of the gear causes the gear to move in a longitudinal direction along the fixed lead screw which leads to the desired movement of the upper track relative to the lower track.

However, the motor and drive assembly only provides powered fore and aft movement of the upper track relative to the lower track, and hence, the sliding fore and aft adjustment of the seat assembly. It is often desirable to quickly and manually move the seat assembly from a passenger fore/aft adjusted position to a full forward easy entry position wherein the upper track is moved forward along the lower track to a forward most position therebetween to allow easy access and entry into the vehicle behind the seat assembly. Further, it is also desirable to maintain or remember the passenger fore/aft adjusted position during fore and aft movement of the seat assembly to the full forward easy entry position.

SUMMARY OF THE INVENTION

According to one aspect of the invention, a power adjuster is provided for adjusting the position of an upper track relative to a lower track of a seat track assembly. An elongated guide rod extends axially between opposite first and second ends and is adapted to be fixedly secured to the lower track. A tubular lead screw extends axially between fore and aft ends and is slidably coupled to the guide rod. A driven assembly is operatively coupled to the tubular lead screw for axial travel along the tubular lead screw between the fore and aft ends in response to rotation of the driven assembly. A drive assembly is adapted to be fixedly coupled to the upper track and operatively coupled to the driven assembly for selectively rotating the driven assembly in opposite first and second directions for axial travel along the tubular lead screw. A release mechanism is adapted to be coupled to the lower track and operable between a locked condition coupled to the tubular lead screw to prevent sliding movement of the tubular lead screw along the guide rod wherein the driven assembly and the drive assembly move axially along the lead screw to slide the upper track relative to the lower track in a power operation mode; and an unlocked condition decoupled from the tubular lead screw to allow sliding movement of the tubular lead screw along the guide rod while the driven assembly and the drive assembly remain axially fixed to the tubular lead screw to slide the upper track relative to the lower track in a manual operation mode.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

Figure 1:
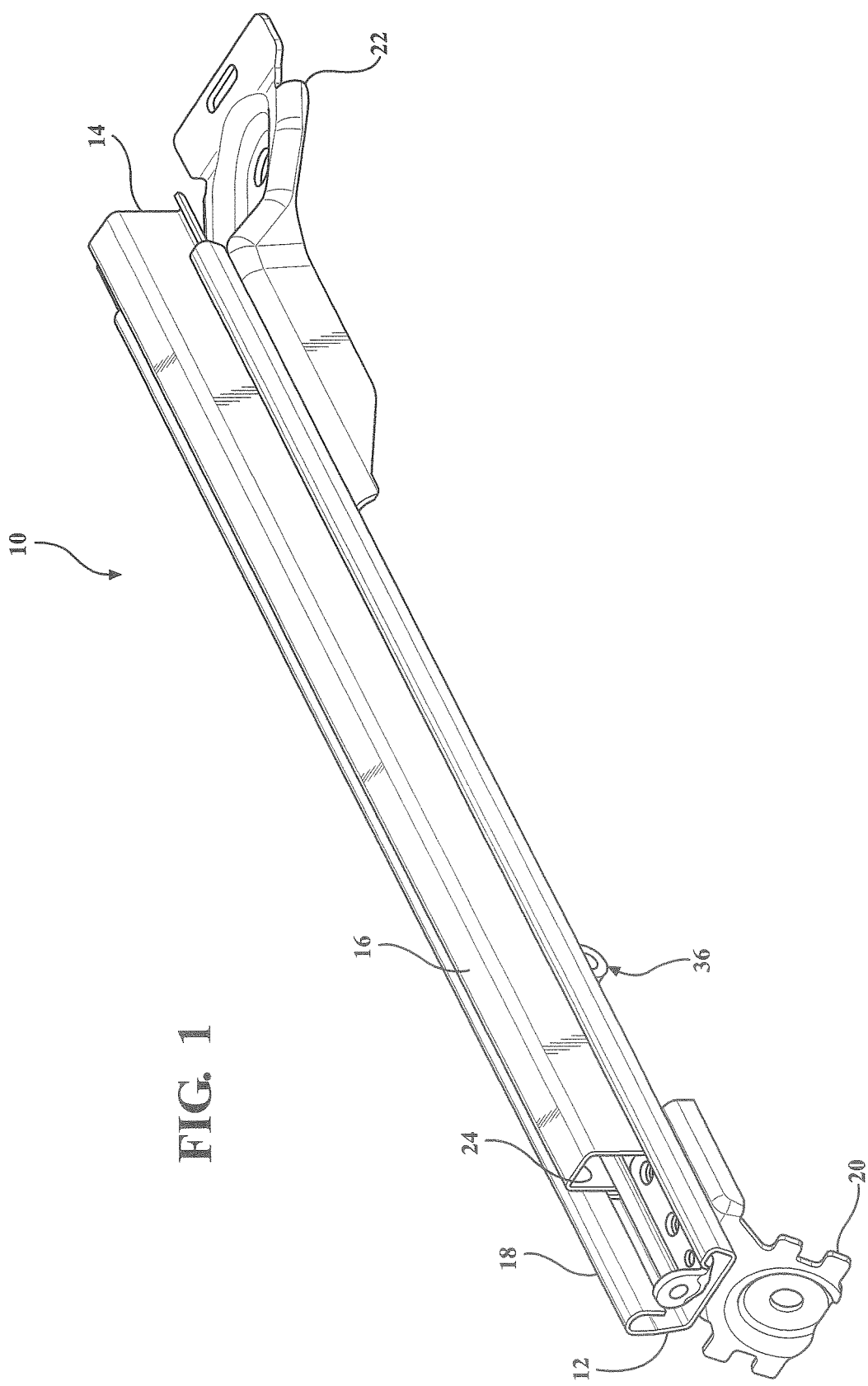
FIG. 1 is a perspective view of the seat track assembly and quick adjust power adjuster according to a preferred embodiment of the invention.

Referring to the Figures, wherein like numerals indicate like or corresponding parts throughout the several views, a seat track assembly 10 is generally shown in the Figures for providing both power and manual sliding fore and aft movement of a seat assembly (not shown) in an automotive vehicle (not shown). The seat track assembly 10 extends longitudinally between opposite fore and aft ends 12, 14 and includes a generally inverted U-shaped upper track 16 slidably and matingly coupled to a generally U-shaped lower track 18 for providing fore and aft sliding movement of the upper track 16 relative to the lower track 18, is commonly known in the art. The upper track 16 is adapted to be fixedly secured to the bottom side of a seat cushion of the seat assembly and the lower track 18 is adapted to be fixedly secured to the floor of the automotive vehicle by one or more mounting risers 20, 22. The upper and lower tracks 16, 18 define a longitudinal internal channel 24 therebeween extending between the fore and aft ends 12, 14. It should be appreciated that an automotive seat assembly includes a pair of parallel and spaced apart seat track assemblies 10 mounted between the bottom of the seat assembly and the floor of the vehicle for providing fore and aft sliding adjustment of the seat assembly within the vehicle as is commonly known in the art.

Figure 2:
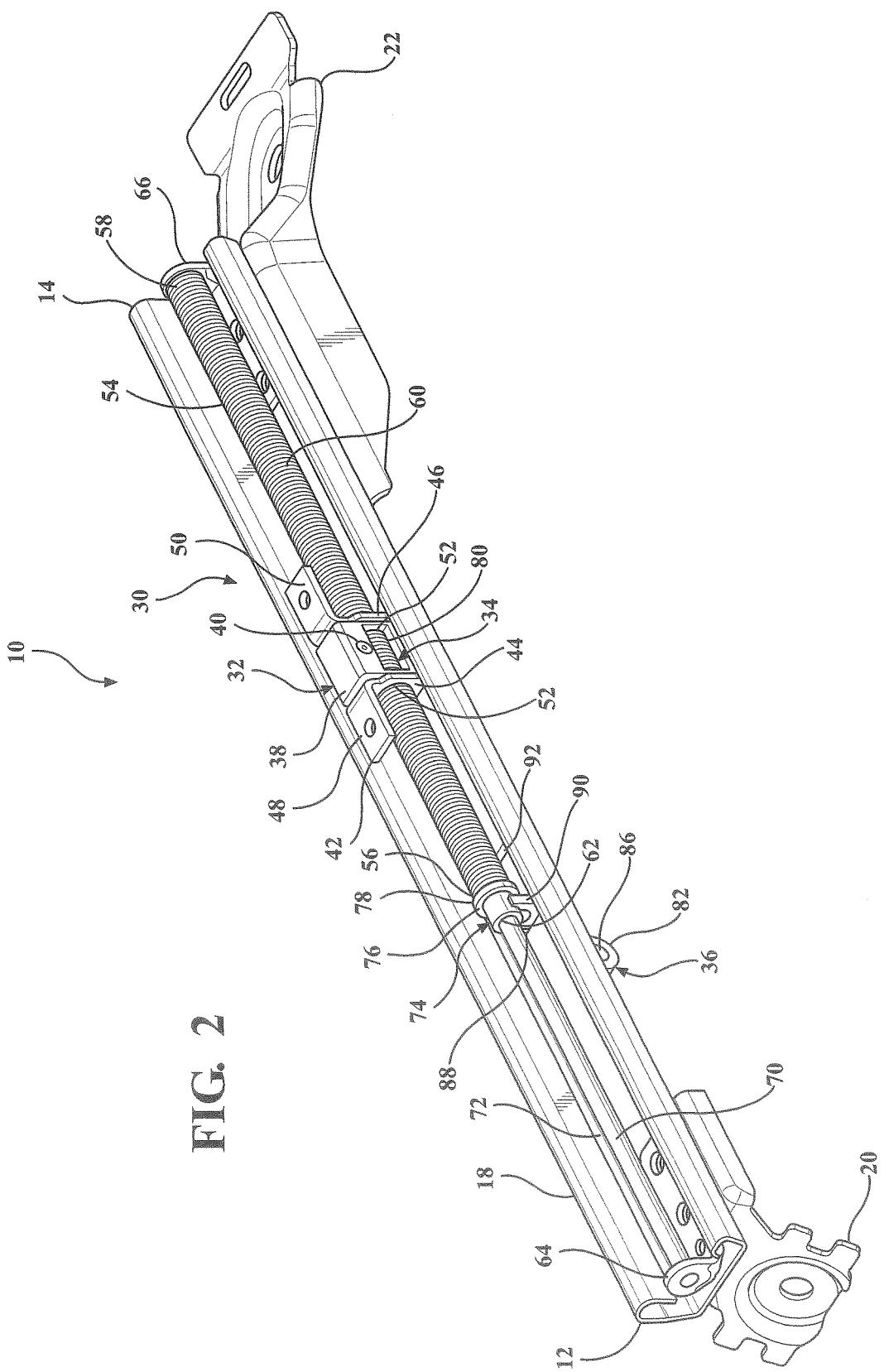
FIG. 2 is a perspective view of the lower track of the seat track assembly and the quick adjust power adjuster in a locked condition with the seat track assembly in a passenger fore/aft adjusted position.

Referring to FIG. 2, the seat track assembly 10 is shown with the upper track 16 removed from the lower track 18. A quick adjust power adjuster 30, hereinafter power adjuster, is operatively coupled between the upper track 16 and lower track 18 for selectively providing either power or manual fore and aft sliding movement of the upper track 16 relative to the lower track 18. The power adjuster 30 includes a drive assembly 32, a driven assembly 34, and a release mechanism 36. The power adjuster 30 is disposed within the channel 24 and is operatively coupled between the upper track 16 and lower track 18. The power adjuster 30 drives the upper track 16 longitudinally, or linearly, fore and aft relative to the lower track 18 in response to rotary input by an electric motor (not shown) as is commonly known in the art. The drive assembly 32 includes a housing 38 having a lateral through bore with an open bottom slot for rotatably supporting a worm gear 40 therein. The drive assembly 32 further includes a generally U-shaped retainer strap 42 for supporting the housing 38 and fixedly securing the drive assembly 32 to the upper track 16. The retainer strap 42 includes longitudinally spaced apart upright portions 44, 46. The upright portion 44 extends into a first horizontal top portion 48 fixedly secured to the upper track 16 and the upright portion 46 extends into a second horizontal top portion 50 facing opposite the first top portion 48 and fixedly secured to the upper track 16. Each of the upright portions 44, 46 further include an axial aligned hole 52. The drive assembly 32 further includes an elongated, hollow tubular lead screw 54 extending axially between opposite fore and aft ends 56, 58. The tubular lead screw 54 includes an external helical thread 60 and an internal profile-shaped through bore 62. The profile shape of the through bore 62 may be hex-shaped or D-shaped when viewed in cross-section, however, it should be appreciated that the shape may vary as desired.

The lower track 18 includes a pair of mounting flanges 64, 66 projecting upwardly therefrom adjacent opposing respective fore and aft ends 12, 14 of the lower track 18. An elongated, rigid and cylindrical guide rod 70 extends longitudinally between and is fixedly coupled to the respective fore and aft mounting flanges 64, 66. The guide rod 70 includes a profile-shaped outer surface 72, such as a hex-shape or D-shape when viewed in cross-section, corresponding to the profile shape of the through bore 62. The tubular lead screw 54 is slidably journaled to the guide rod 70 between the opposite ends thereof. More specifically, the shape of the outer surface 72 of the guide rod 70 is corresponding or keyed to match the shape of the through bore 62 of the tubular lead screw 54 to allow axial sliding movement of the tubular lead screw 54 along the guide 70 while preventing rotation of the tubular lead screw 54 relative to the guide rod 70. The tubular lead screw 56 also includes a locking lug 74 fixedly secured to the fore end 56 thereof. The locking lug 74 includes a collar portion 76 and a radial flange portion 78 defining an abutment wall adjacent the fore end 56 of the tubular lead screw 54.

The driven assembly 34 includes a driven gear 80 supported between the upright portions 44, 46 of the retainer strap 42 and having an external helical thread in meshed engagement with the worm gear 40 and an internal helical thread in meshed engagement with the helical thread 60 of the tubular lead screw 54.

The drive assembly 32 drives the upper track 16 longitudinally, or linearly, fore and aft relative to the lower track 18 in response to rotary input by an electric drive motor (not shown) as is commonly known in the art. That is, an electric drive motor (not shown) drives and rotates the worm gear 40 to rotatably drive the driven gear 80. The driven gear 80 rotates about the tubular lead screw 54 and travels axially along tubular lead screw 54 thereby automatically sliding the upper track 16 fore and aft relative to the lower track 18. The details and operation of a more specific and exemplary drive assembly is described in Applicant's U.S. Pat. No. 8,226,063 which is incorporated herein by reference in its entirety.

Figure 3:
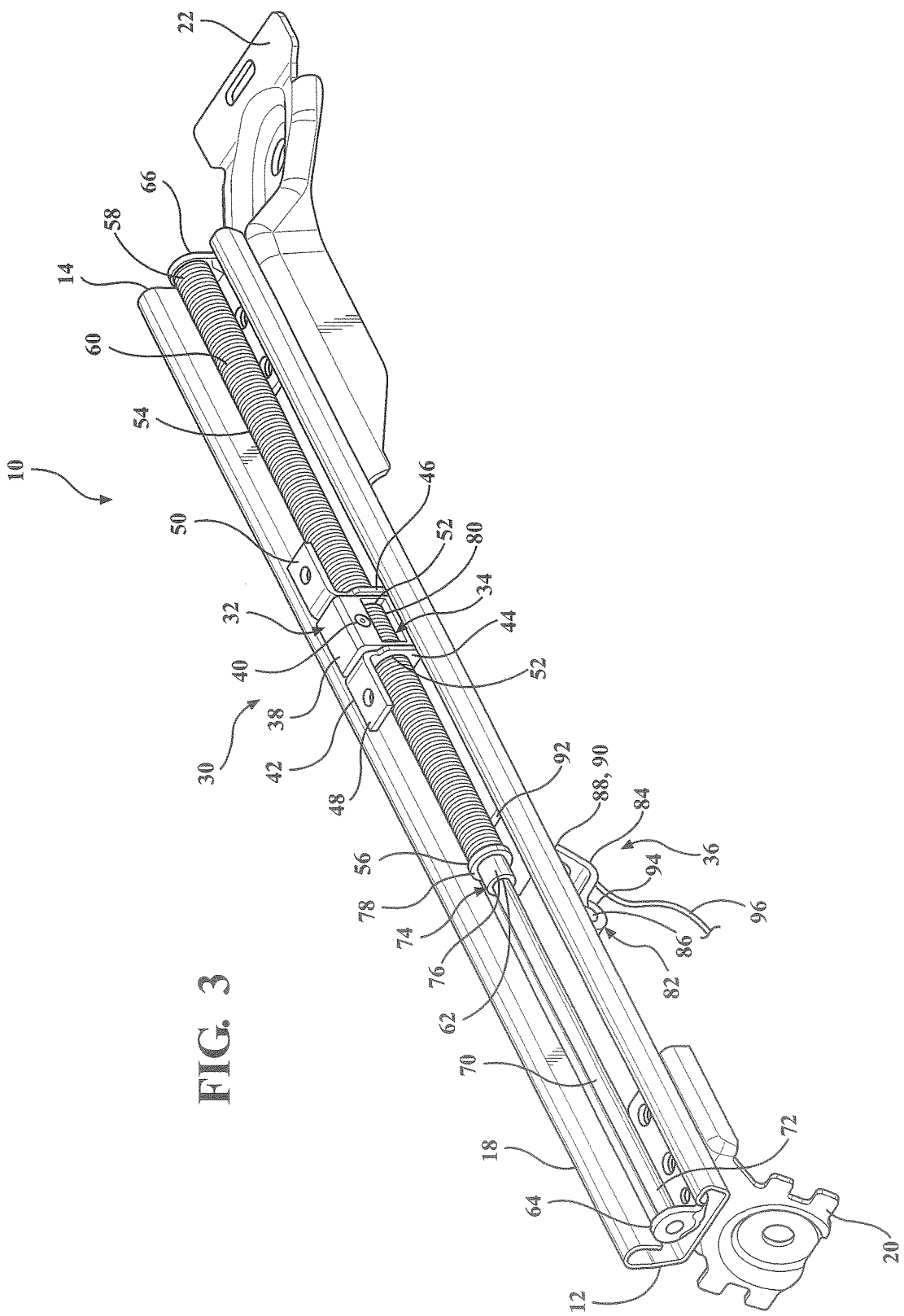
FIG. 3 is a perspective view of the lower track of the seat track assembly and the quick adjust power adjuster in an unlocked condition.

The tubular lead screw 54 is shown in a home position in FIG. 2 positioned along the guide rod 70 adjacent the aft end 14 of the lower track 18 which provides for power fore/aft adjustment of the seat track assembly 10 as will be further described. The release mechanism 36 includes a quick adjust latch 82 operatively coupled to the lower track 18 for selective engagement with the locking lug 74 between a locked condition, as shown in FIG. 2, retaining the lead screw tubular 54 in the home position and an unlocked condition, as shown in FIG. 3, allowing the tubular lead screw 54 to slide longitudinally along the guide rod 70. More specifically, the quick adjust latch 82 includes a latch arm 84 pivotally coupled to the bottom of the lower track 18 by pivot 86. A pair of spaced apart latch prongs 88, 90 extend from the latch arm 84 and project through an opening 92 formed in the bottom of the lower track 18. A biasing spring 94, such as a clock spring, is operatively coupled between the latch arm 84 and the lower track 18 for biasing the quick adjust latch 82 to pivot to the locked condition wherein the latch prongs 88, 90 extends through the opening 92 and around opposing sides of the collar portion 76 of the locking lug 74 against the abutment wall of the flange portion 78 to prevent sliding movement of the tubular lead screw 54 along the guide rod 70 and retain the tubular lead screw 54 in the home position. A Bowden type push-pull cable 96, or other type of actuator, is connected to the quick adjust latch 82 for actuating and pivoting the latch 82 to the unlocked condition releasing the latch prongs 88, 90 from the locking lug 74 and spaced below the opening 92 in the lower track 18 allowing the tubular lead screw 54 to slide longitudinally along the guide rod 70 towards the fore end 12 of the lower track 18.

In operation, the seat track assembly 10 is shown in a fore/aft seat adjusted position for seat occupant comfort in FIGS. 1 and 2. The release mechanism 36 of the power adjuster 30 is in the locked condition with the latch prongs 88, 90 of the quick adjust latch 82 extending through the opening 92 in the lower track 18 and engaged with the locking lug 74 against the flange portion 78 to prevent sliding movement of the tubular lead screw 54 along the guide rod 70. With the release mechanism 36 in the locked condition, the electric motor may be actuated to rotate the worm gear 40 of the drive assembly 32 in first or second rotational directions as is commonly known in the art. It should be appreciated that the electric motor may have an output drive shaft connected directly to the worm gear 40 or have a cable or other flexible shaft extending between and interconnecting the output shaft of the electric motor with the worm gear 40. Rotation of the worm gear 40 in a first rotational direction causes rotation of the driven gear 80. The meshed engagement of the driven gear 80 with the helical thread 60 of the tubular lead screw 54 causes the driven gear 80, and thus the driven assembly 34, to travel longitudinally along the tubular lead screw 54 between the fore and aft ends 56, 58. The keyed corresponding and mating profile shape of the through bore 62 of the tubular lead screw 54 with the outer surface 72 of the guide rod 70 prevents the tubular lead screw 54 from rotating about the guide rod 70. Since the drive assembly 32 and driven assembly 34 are coupled to the upper track 16 by the retainer strap 42, the drive assembly 32 and driven assembly 34 force the upper track 16 to move longitudinally fore and aft along the lower track 18 in a powered operation mode for seat occupant adjustment of the seat track assembly 10 and automotive seat within the vehicle.

Figure 4:
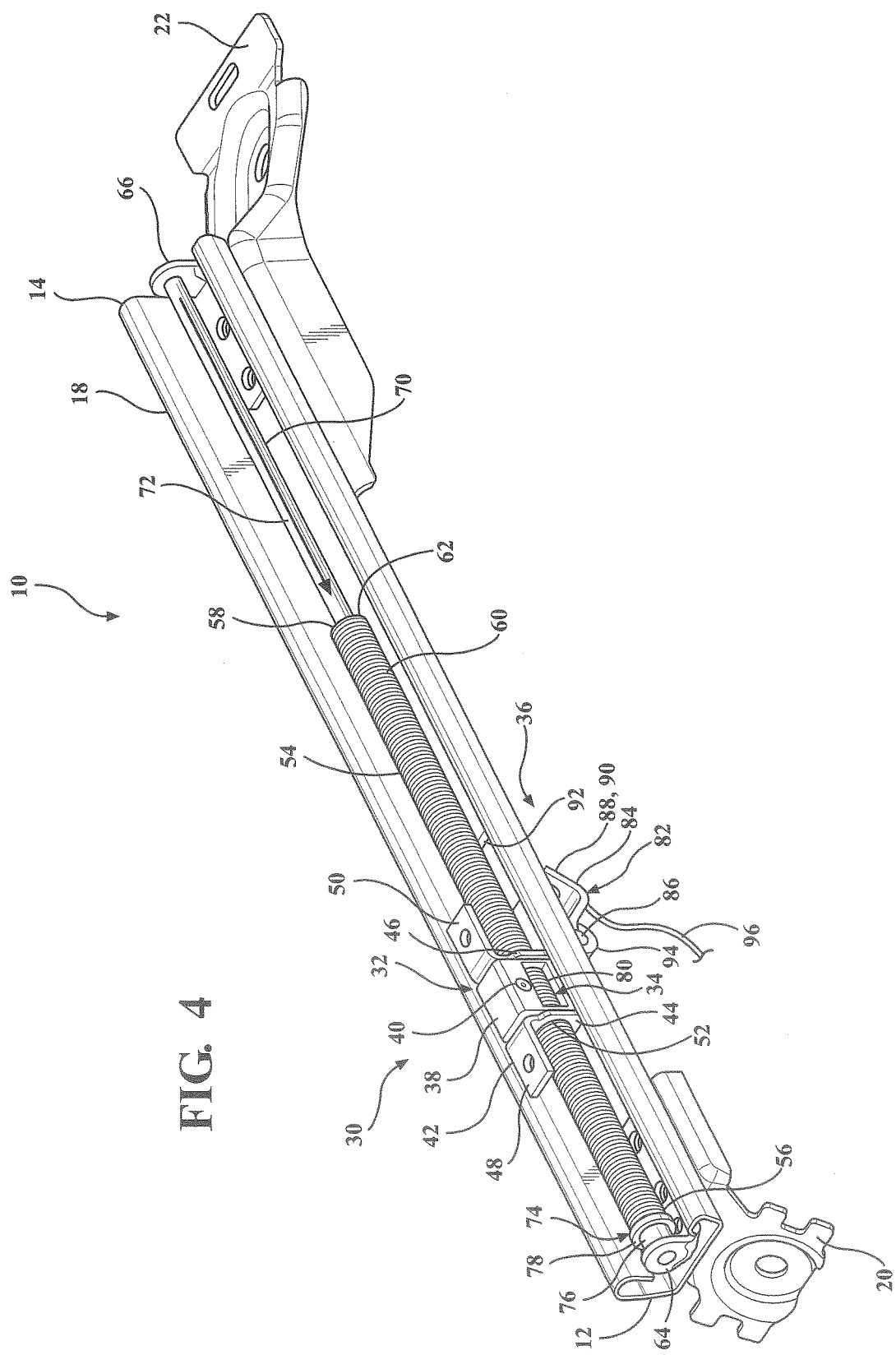
FIG. 4 is a perspective view of the lower track of the seat track assembly and the quick adjust power adjuster with the seat track assembly in the fall forward, easy entry position.

Referring to FIGS. 3 and 4, the cable 96 may be pulled to actuate and pivot the release mechanism 36 to the unlocked condition with the latch prongs 88, 90 released from engagement with the locking lug 74 and moved below the opening 92 in the lower track 18. In the unlocked condition, the drive assembly 32 and driven assembly 34 remain coupled with the tubular lead screw 54. However, with the release mechanism 36 in the unlocked condition decoupled from the tubular lead screw 54, referred to as the manual operation mode, the upper track 16 is free to move longitudinally fore and aft along the lower track 18 without actuation of the electric motor or drive assembly 32 from the seat adjusted position to a forward-most position along the lower track 18, defined as an easy entry position, as shown in FIG. 4 to allow access behind the seat assembly within the vehicle. That is, with the release mechanism 36 in the unlocked condition and the quick adjust latch 82 decoupled from engagement with the locking lug 74 of the tubular lead screw 54, the tubular lead screw 54 is free to slide longitudinally along the guide rod 70 from the home position shown in FIG. 3 to the fore end of the guide rod 70 adjacent the fore end 12 of the lower track 18 as shown in FIG. 4, defining the easy entry position. As also shown in FIG. 4, the drive assembly 32 and driven assembly 34 are fixedly secured to the upper track 16 and in meshed engagement with the tubular lead screw 54, and therefore travel fore and aft with the upper track 16 relative to the lower track 18. Additionally, with the driven assembly 34 coupled with the tubular lead screw 54, the driven assembly 34 maintains its previously adjusted position along the tubular lead screw 54 to maintain a memory position of the previous fore/aft seat adjusted position of FIGS. 1 and 2.

Finally, the seat track assembly 10 may be manually returned from the easy entry position to the fore/aft seat adjusted position by manually sliding the upper track 16 longitudinally along the lower track 18 until the tubular lead screw 54 is returned to the home position along the guide rod 70 shown in FIG. 3. Upon return to the home position, the release mechanism 36 returns to the locked condition with the latch prongs 88, 90 of the quick adjust latch 82 extending through the opening 92 in the lower track 18 and engaging with the flange portion 78 of the locking lug 74 to prevent further sliding movement of the tubular lead screw 54 along the guide rod 70 and allow for continued use in the power operation mode as previously described.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed:

1. A power adjuster for adjusting the position of an upper track relative to a lower track of a seat track assembly comprising:
    an elongated guide rod extending axially between opposite first and second ends and adapted to be fixedly secured to said lower track;
    a tubular lead screw extending axially between fore and aft ends and slidably coupled to said guide rod;
    a driven assembly operatively coupled to said lead screw for axial travel along said lead screw between said fore and aft ends in response to rotation of said driven assembly;
    a drive assembly adapted to be fixedly coupled to the upper track and operatively coupled to said driven assembly for selectively rotating said driven assembly in opposite first and second directions for axial travel along said tubular lead screw; and
    a release mechanism adapted to be coupled to said lower track and operable between a locked condition coupled to said tubular lead screw to prevent sliding movement of said tubular lead screw along said guide rod wherein said driven assembly and said drive assembly move axially along said tubular lead screw to slide said upper track relative to said lower track in a power operation mode and an unlocked condition decoupled from said tubular lead screw to allow sliding movement of said tubular lead screw along said guide rod while said driven assembly and said drive assembly remain axially fixed to said tubular lead screw to slide said upper track relative to said lower track in a manual operation mode.

2. The power adjuster as set forth in claim 1 wherein said drive assembly includes a drive gear and said driven assembly includes a driven gear in meshed engagement between said drive gear and said tubular lead screw wherein said driven gear moves axially along said tubular lead screw in response to rotation of said drive gear in said power operation mode.

3. The power adjuster as set forth in claim 2 wherein said tubular lead screw includes an external helical thread extending between fore and aft ends thereof and said driven gear is in threaded meshed engagement with said helical thread of said tubular lead screw.

4. The power adjuster as set forth in claim 3 wherein said tubular lead screw includes an axial through bore having a defined profile shape and said guide rod includes an outer surface having a defined profile shape corresponding to said defined profile shape of said through bore for allowing said tubular lead screw to slide axially along said guide rod while preventing rotation of said tubular lead screw relative to said guide rod.

5. The power adjuster as set forth in claim 4 wherein said tubular lead screw includes a locking lug adjacent one of said fore and aft end of said tubular lead screw and said release mechanism includes a quick adjust latch operable between a locked condition for engaging said locking lug and retaining said tubular lead screw along said guide rod in a fixed home position and an unlocked condition released from said locking lug and allowing said tubular lead screw to slide axially along said guide rod.

6. The power adjuster as set forth in claim 5 wherein said quick adjust latch includes a latch arm and a pair of spaced apart latch prongs extending front said latch arm for selecting locking engagement with the said locking lug of said tubular lead screw in said locked condition.

7. The power adjuster as set forth in claim 6 wherein said release mechanism includes an actuator for selectively actuating said quick adjust latch between said locked and unlocked conditions with said tubular lead screw in said home position.

8. The power adjuster as set forth in claim 7 wherein said release mechanism includes a bias spring coupled to said latch arm for biasing said quick adjust latch to said locked condition.

9. The power adjuster as set forth in claim 8 wherein said drive assembly includes housing for rotatably supporting said drive gear and a retainer strap for supporting said housing and adapted to fixedly attached said drive assembly to said upper track.

10. The power adjuster as set forth in claim 9 wherein said driven gear is rotatably supported by said housing in meshed engagement between said drive gear and said tubular lead screw for axial travel along said tubular lead screw in response to rotation of said driven gear in said power operation mode.

* * * * *